(12) United States Patent
Ito et al.

(10) Patent No.: US 7,832,214 B2
(45) Date of Patent: Nov. 16, 2010

(54) AIR-CONDITIONING DEVICE

(75) Inventors: Yuji Ito, Okazaki (JP); Shinji Aoki, Chiryu (JP); Takuhiko Sawai, Kariya (JP)

(73) Assignee: Denso Corporation, Kariya (JP)

( * ) Notice: Subject to any disclaimer, the term of this patent is extended or adjusted under 35 U.S.C. 154(b) by 515 days.

(21) Appl. No.: 11/708,158

(22) Filed: Feb. 19, 2007

(65) Prior Publication Data

US 2007/0209369 A1 Sep. 13, 2007

(30) Foreign Application Priority Data

Mar. 7, 2006 (JP) .............................. 2006-061291

(51) Int. Cl.
*F25B 21/02* (2006.01)
*F25D 17/00* (2006.01)
*B60H 1/32* (2006.01)

(52) U.S. Cl. .............................. 62/3.61; 62/3.7; 62/3.2; 62/178; 62/244; 62/239

(58) Field of Classification Search .................. 62/3.61, 62/178
See application file for complete search history.

(56) References Cited

U.S. PATENT DOCUMENTS

| | | | | |
|---|---|---|---|---|
| 3,438,214 | A | * | 4/1969 | Schmittle ........................ 62/3.3 |
| 5,450,894 | A | * | 9/1995 | Inoue et al. ..................... 165/43 |
| 5,524,439 | A | | 6/1996 | Gallup et al. |
| 5,626,021 | A | | 5/1997 | Karunasiri et al. |
| 5,715,695 | A | * | 2/1998 | Lord ........................... 62/259.3 |
| 5,921,314 | A | * | 7/1999 | Schuller et al. ................ 165/43 |
| 5,934,748 | A | * | 8/1999 | Faust et al. ............. 297/180.12 |
| 6,059,018 | A | * | 5/2000 | Yoshinori et al. .............. 165/42 |
| 6,079,485 | A | * | 6/2000 | Esaki et al. ..................... 165/43 |
| RE38,128 | E | | 6/2003 | Gallup et al. |
| 6,606,866 | B2 | * | 8/2003 | Bell ............................... 62/3.7 |
| 6,722,148 | B2 | * | 4/2004 | Aoki et al. ..................... 62/244 |

(Continued)

FOREIGN PATENT DOCUMENTS

DE 103 16 732 A1 10/2004

(Continued)

OTHER PUBLICATIONS

Office action dated Sep. 5, 2008 in Chinese Application No. 2007-1008 5054.2 with English translation thereof.

(Continued)

*Primary Examiner*—William E Tapolcai
*Assistant Examiner*—Filip Zec
(74) *Attorney, Agent, or Firm*—Harness, Dickey & Pierce, PLC

(57) ABSTRACT

An air-conditioning device includes a pump for sending a thermal medium, a thermoelectric conversion unit for absorbing heat from the thermal medium, a target setting unit for setting a target cooling value, and a controlling unit. The controlling unit increases a flow amount of the thermal medium to be larger than a predetermined amount and stops the thermoelectric conversion unit from absorbing heat, when the target cooling value is smaller than a predetermined value. The controlling unit increases a heat-absorbing amount of the element and keeps the flow amount of the thermal medium to be larger than the predetermined amount, when the target cooling value is equal to or larger than the predetermined value.

14 Claims, 5 Drawing Sheets

U.S. PATENT DOCUMENTS

| | | | |
|---|---|---|---|
| 6,803,672 B2 * | 10/2004 | Gunasekera | 307/9.1 |
| 6,892,807 B2 * | 5/2005 | Fristedt et al. | 165/202 |
| 2004/0055312 A1 * | 3/2004 | Bell | 62/3.7 |
| 2004/0206099 A1 * | 10/2004 | Kim | 62/178 |
| 2005/0268621 A1 * | 12/2005 | Kadle et al. | 62/3.2 |
| 2006/0130490 A1 * | 6/2006 | Petrovski | 62/3.3 |

FOREIGN PATENT DOCUMENTS

| | | |
|---|---|---|
| JP | 05-277020 | 10/1993 |
| JP | 06-094323 | 4/1994 |
| JP | 06-146371 | 5/1994 |
| JP | 06-147524 | 5/1994 |
| JP | 10-297275 | 11/1998 |
| JP | 2003-34167 | 2/2003 |
| JP | 2005-047456 | 2/2005 |

OTHER PUBLICATIONS

Office action dated Jan. 11, 2010 in German Application No. 10 2007 010 543.8 with English translation thereof.

Office action dated Jul. 13, 2010 in Japanese Application No. 2006-061291.

* cited by examiner

AIR-CONDITIONING DEVICE

CROSS REFERENCE TO RELATED APPLICATION

This application is based on Japanese Patent Application No. 2006-61291 filed on Mar. 7, 2006, the disclosure of which is incorporated herein by reference in its entirety.

BACKGROUND OF THE INVENTION

1. Field of the Invention

The present invention relates to an air-conditioning device using a thermoelectric conversion unit.

2. Description of Related Art

JP-A-6-147524, JP-A-6-146371 or U.S. Pat. No. 5,524,439 (corresponding to JP-A-9-505497) discloses an air-conditioning device, in which a Peltier element, i.e., thermoelectric conversion unit, is used.

Generally, a refrigeration cycle device performs cooling operation by compressing and expanding refrigerant in a refrigeration cycle, and has a coefficient of performance (COP) in a range between 3 and 4. However, the air-conditioning device using the Peltier element has the COP in a range between 0.2 and 1. That is, efficiency for performing cooling operation of the air-conditioning device using the Peltier element is much lower than that of the refrigeration cycle device.

SUMMARY OF THE INVENTION

In view of the foregoing and other problems, it is an object of the present invention to provide an air-conditioning device using a thermoelectric conversion unit, which can effectively improve the efficiency in a cooling operation or a heating operation.

According to a first example of the present invention, an air-conditioning device includes a pump, a thermoelectric conversion unit, a target setting unit and a controlling unit. The pump sends a thermal medium. The thermoelectric conversion unit absorbs heat from the thermal medium so as to perform air-conditioning. The target setting unit sets a target cooling value for cooling the thermal medium. The controlling unit controls a flow amount of the thermal medium from the pump and a heat-absorbing amount of the thermoelectric conversion unit based on the target cooling value. The controlling unit increases the flow amount of the thermal medium from the pump to be larger than a predetermined amount and stops the thermoelectric conversion unit from absorbing heat, when the target cooling value is smaller than a predetermined value. The controlling unit increases the heat-absorbing amount of the thermoelectric conversion unit in accordance with the target cooling value and keeps the flow amount of the thermal medium to be larger than the predetermined amount, when the target cooling value is equal to or larger than the predetermined value.

Accordingly, the air-conditioning device can have a high efficiency for a cooling operation.

According to a second example of the present invention, an air-conditioning device includes a pump, a thermoelectric conversion unit, a target setting unit and a controlling unit. The pump sends a thermal medium. The thermoelectric conversion unit radiates heat from the thermal medium so as to heat the thermal medium. The target setting unit sets a target heating value for heating the thermal medium. The controlling unit controls a flow amount of the thermal medium from the pump and a heat-radiating amount of the thermoelectric conversion unit based on the target heating value. The controlling unit increases the flow amount of the thermal medium from the pump to be larger than a predetermined amount and stops the thermoelectric conversion unit from radiating heat, when the target heating value is smaller than a predetermined value. The controlling unit increases the heat-radiating amount of the thermoelectric conversion unit in accordance with the target heating value and keeps the flow amount of the thermal medium to be larger than the predetermined amount, when the target heating value is equal to or larger than the predetermined value.

Accordingly, the air-conditioning device can have a high efficiency for a heating operation.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENT

Figure 1:
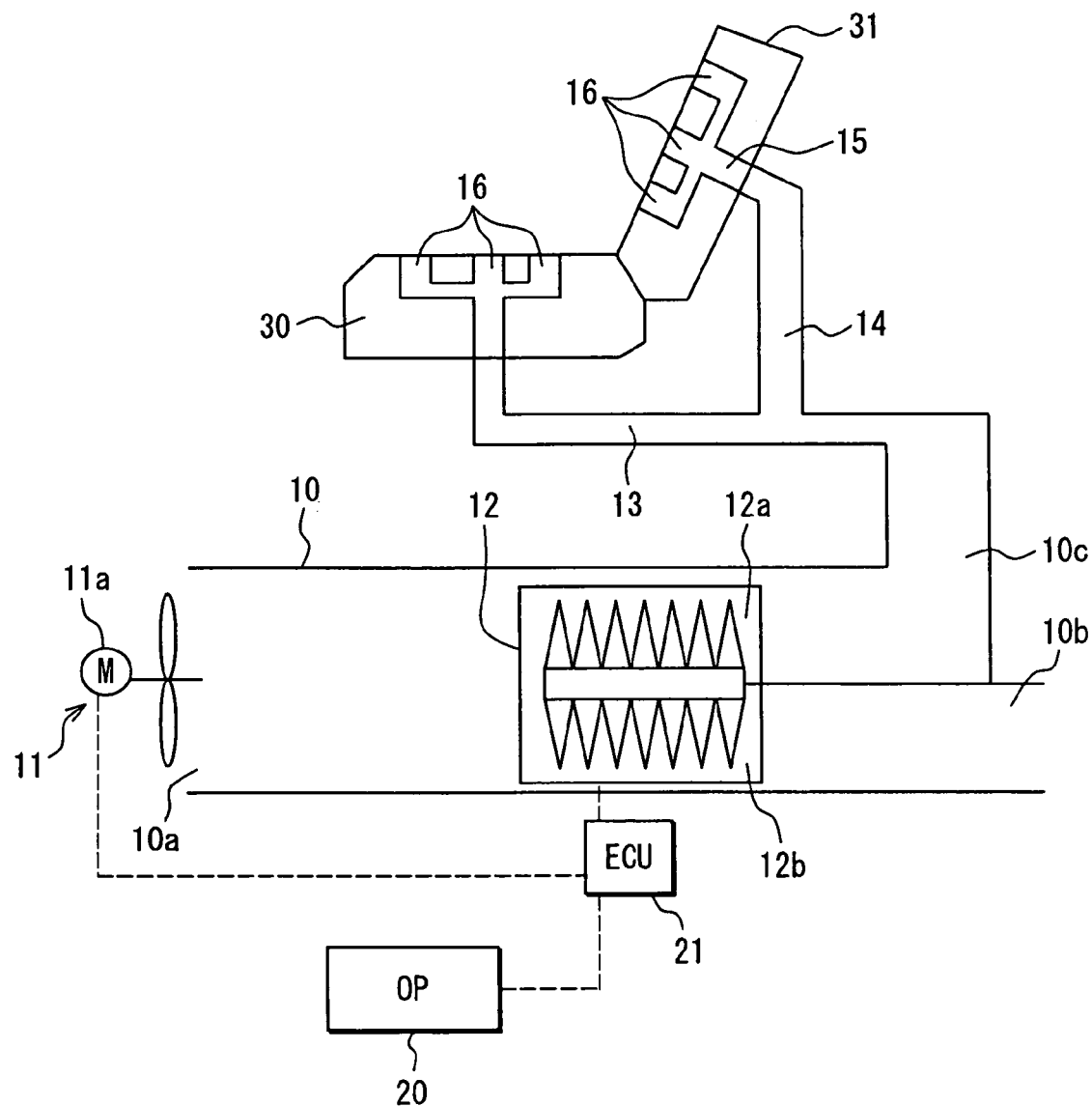
FIG. 1 is a schematic diagram showing an air-conditioning device for a vehicle seat according to an embodiment of the present invention.

As shown in FIG. 1, an air-conditioning device is typically used for a vehicle seat having a seat cushion 30 and a seat back 31, and includes a duct 10. The duct 10 has a suction portion 10a for introducing air (i.e., inside air) from a compartment of the vehicle. A fan 11 (pump) is disposed at the suction portion 10a. The fan 11 includes centrifugal bladed wheels, which are driven by a direct current (DC) motor 11a. An air-sending amount (air-blowing amount) of the fan 11 is controllable by a voltage applied to the DC motor 11a.

A Peltier element 12 (thermoelectric conversion unit) is disposed at a downstream side of the fan 11 in the duct 10. The Peltier element 12 is formed by alternately layering a p-type semiconductor and an n-type semiconductor. The Peltier element 12 includes a first heat exchanger 12a and a second heat exchanger 12b. The duct 10 is separated into a first passage 10c and a second passage 10b (aperture) at a downstream side of the Peltier element 12. The first heat exchanger 12a is disposed in the first passage 10c, and absorbs heat from air sent from the fan 11 so as to cool air. The second heat exchanger 12b is disposed in the second passage 10b, and discharges a waste heat out of the duct 10. The second passage 10b makes an inside and an outside of the duct 10 to communicate with each other.

A first branch duct 13 and a second branch duct 14 are connected to a downstream side of the first passage 10c of the duct 10. The first branch duct 13 is connected to the seat cushion 30, and the second branch duct 14 is connected to the seat back 31. Each of the seat cushion 30 and the seat back 31 is formed by covering a urethane resin with a leather (seat face layer), for example. A passage 15 is provided in the urethane resin of the seat cushion 30 and the seat back 31, and air flows from the branch duct 13, 14 into the passage 15. The leather has micro pores 16 for emitting air from the passage 15 toward a body, e.g., the hip or the back, of an occupant on the seat.

The air-conditioning device includes an operation panel 20 (OP) and an electrical control unit 21 (ECU). An operator, e.g., the occupant, operates the operation panel 20 so as to input a target cooling value into the ECU 21. The ECU 21 is constructed with a microcomputer and a memory, for example, and controls the fan 11 and the Peltier element 12 based on the target cooling value.

Figure 2:
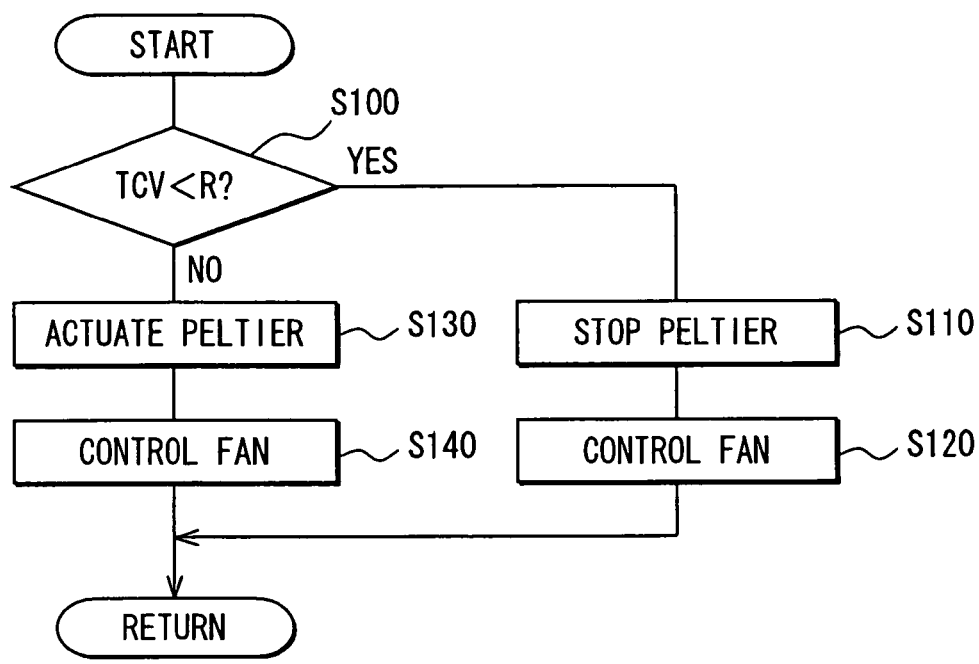
FIG. 2 is a flow chart showing a control of the device.

Next, operation of the device will be described. The ECU 21 performs control operation based on a computer program, as shown in a flow chart of FIG. 2. After an ignition switch of the vehicle is turned on, the computer program is performed every predetermined period.

At step S100, the ECU 21 compares the target cooling value (TCV) with a predetermined first value R. When the target cooling value is smaller than the first value R, the ECU 21 stops operation of the Peltier element 12, at step S110. Then, at step S120, the ECU 21 controls an amount of air blown from the fan 11 based on the target cooling value.

In contrast, when the target cooling value is equal to or larger than the first value R, the ECU 21 actuates the Peltier element 12, based on the target cooling value, at step S130. Then, at step S140, the ECU 21 keeps controlling the amount of air blown from the fan 11.

Figure 3:
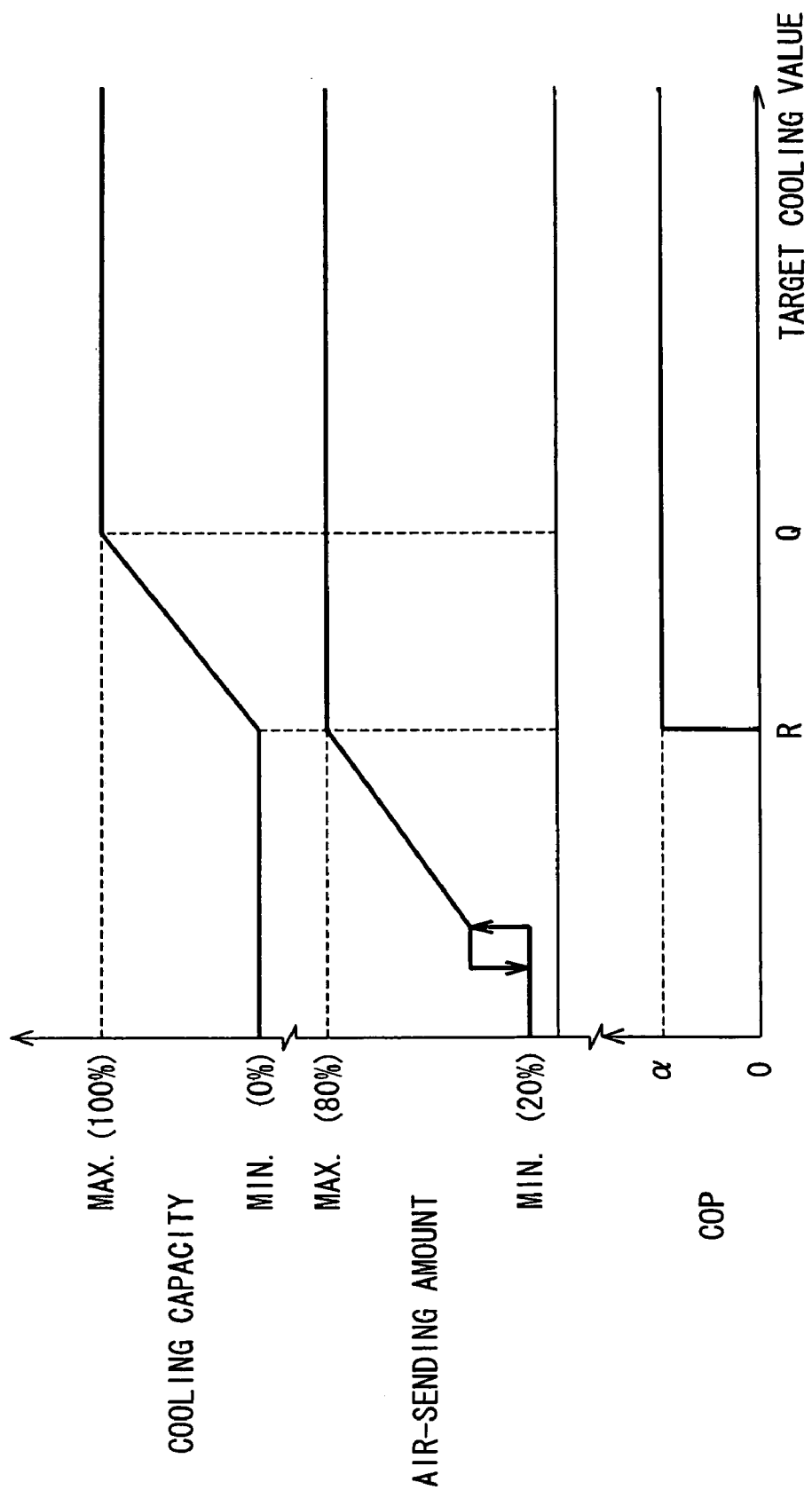
FIG. 3 is a graph showing a relationship between a target cooling value and a cooling capacity of a Peltier element, an air-sending amount, and a coefficient of performance (COP) of the Peltier element in the device.

Here, as shown in FIG. 3, an air-sending amount is changed in accordance with the target cooling value. As the target cooling value increases, the air-sending amount by the fan 11 is increased from a minimum amount to a maximum amount. The air-sending amount of the fan 11 is controlled by a pulse width modulation (PWM) method. The DC motor 11a of the fan 11 is supplied with a control pulse signal having a duty ratio in a range between 20% and 80%. Thereby, the air-sending amount can be controlled by the control pulse signal.

The duty ratio is set to 20% for the minimum air-sending amount, in order to secure a minimum starting voltage for the DC motor 11a. The duty ratio is set to 80% for the maximum air-sending amount, in order to reduce noises and vibrations of the DC motor 11a.

When the target cooling value is smaller than the first value R, steps S100, S110 and S120 are repeated. Most of air blown from the fan 11 passes through the first heat exchanger 12a, and flows into the branch duct 13, 14. Then, air is blown from the passage 15 toward the occupant through the micro pores 16 of the seat surface layer. A part of the air sent from the fan 11 is blown out of the duct 10 through the second heat exchanger 12b in the second passage 10b.

In contrast, when the target cooling value is equal to or larger than the first value R, the cooling capacity of the Peltier element 12 is controlled based on the target cooling value. The cooling capacity of the Peltier element 12 is changed in accordance with the target cooling value. When the target cooling value is in a range between the predetermined first value R and a predetermined second value Q, the cooling capacity of the Peltier element 12 is increased from a minimum value to a maximum value, as the target cooling value increases. When the target cooling value is equal to or larger than the second value Q, the cooling capacity of the Peltier element 12 is kept to be the maximum value. The ECU 21 controls the cooling capacity of the Peltier element 12 by changing a duty ratio of a control signal supplied to the Peltier element 12. The control signal has a constant amplitude (height).

When the target cooling value is equal to or larger than the first value R, steps S100, S130 and S140 are repeated. Most of air blown from the fan 11 is cooled in the first heat exchanger 12a, and flows into the branch duct 13, 14. Then, air cooled by the first heat exchanger 12a is blown from the passage 15 toward the occupant through the micro pores 16 of the seat face layer. A part of the air sent from the fan 11 is blown toward the second heat exchanger 12b in the second passage 10b, and cools the second heat exchanger 12b.

According to the embodiment, when the target cooling value is smaller than the first value R, the ECU 21 stops the Peltier element, and controls only the air-sending amount of the fan 11. In contrast, when the target cooling value is equal to or larger than the first value R, the ECU 21 controls the cooling capacity of the Peltier element 12, and keeps the air-sending amount of the fan 11 to be the maximum amount.

Figure 4:
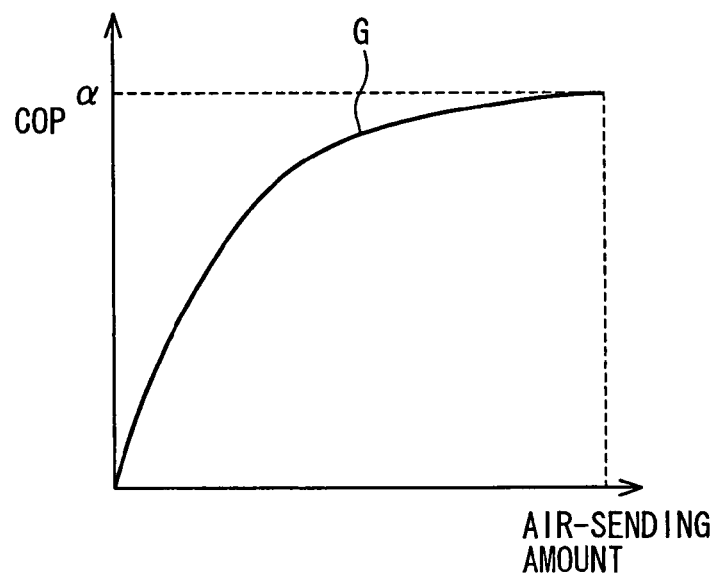
FIG. 4 is a graph showing a relationship between the air-sending amount and the coefficient of performance (COP) of the Peltier element.
Figure 5:
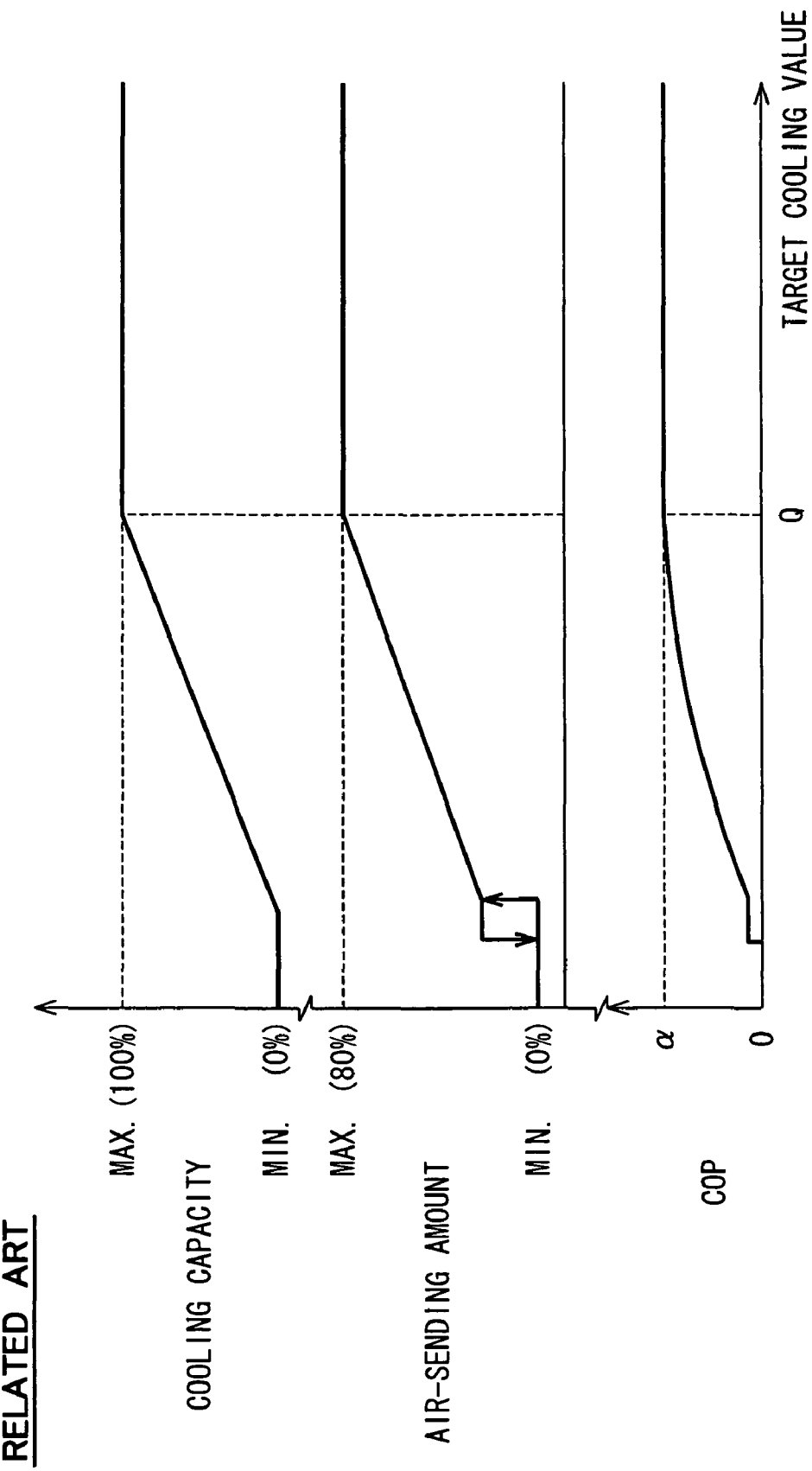
FIG. 5 is a graph showing a relationship between a target cooling value and a cooling capacity of a Peltier element, an air-sending amount, and a coefficient of performance (COP) of the Peltier element in a related device.

Here, as shown of the graph G in FIG. 4, as the air-sending amount of the fan 11 is increased, the Peltier element 12 has a larger coefficient of performance (COP). Therefore, when the Peltier element 12 is actuated while the air-sending amount of the fan 11 is small, the COP of the Peltier element 12 is low, as shown in FIG. 5.

However, according to the embodiment, when the target cooling value is smaller than the first value R, the Peltier element 12 is not actuated. When the target cooling value is equal to or larger than the first value R, the Peltier element 12 is actuated, and the air-sending amount of the fan 11 is kept to be the maximum amount.

Here, the cooling capacity of the Peltier element 12 is controlled by the duty ratio of the control signal having the constant height. The COP of the Peltier element 12 is changed by the height of the control signal. Therefore, as show in FIG. 3, the COP of the Peltier element 12 can be kept to be constant, when the target cooling value is equal to or larger than the first value R.

According to the embodiment, when the COP of the Peltier element 12 is low, the Peltier element 12 is not actuated. The Peltier element 12 is actuated only when the COP of the Peltier element 12 is high. Accordingly, efficiency for cooling operation of the device can be improved.

Further, consumption energy for generating the maximum air-sending amount in the fan 11 is much smaller than that for actuating the Peltier element 12. Therefore, operation efficiency of the air-conditioning device in the cooling operation can be improved, compared with a case of FIG. 5, in which the Peltier element 12 is actuated even when the air-sending amount is small.

When the target cooling value is smaller than the first value R, the ECU 21 stops the Peltier element 12, and actuates the fan 11 so as to increase the air-sending amount in accordance with an increase of the target cooling value. Therefore, in a mild season, e.g., spring or autumn, air having a temperature lower than a human body temperature (36° C.) can be blown to the occupant from the seat. Thus, stuffy feeling given to the occupant on the seat can be reduced, and comfortable cooling feeling can be given to the occupant.

When the target cooling value is smaller than the first value R, the operation of the Peltier element 12 is stopped. Therefore, air passing through the second passage 10b can be introduced to the compartment of the vehicle without being heated by the second heat exchanger 12b. Thus, a temperature in the compartment can be kept low.

Figure 6:
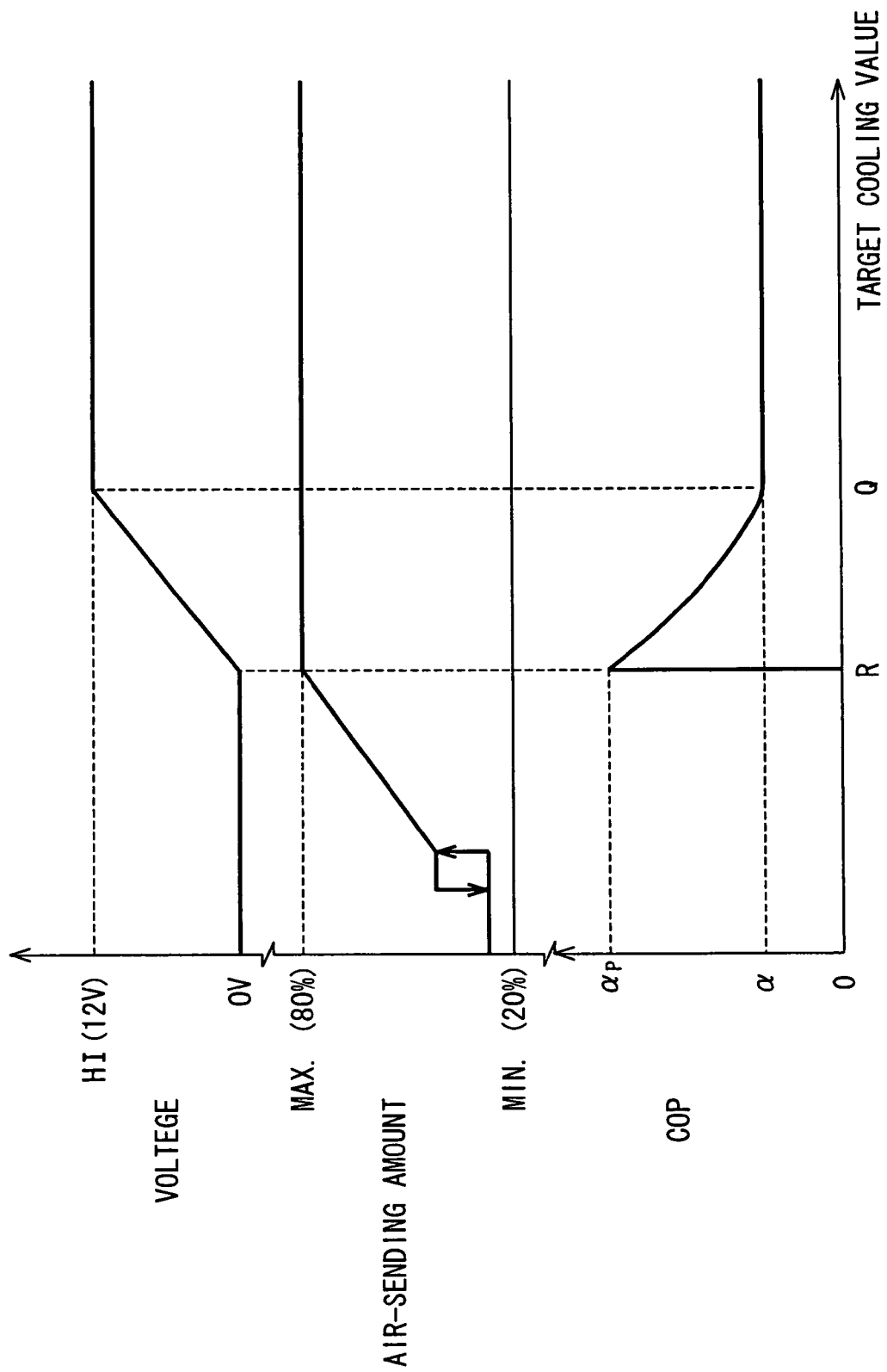
FIG. 6 is a graph showing a relationship between a target cooling value and a cooling capacity of a Peltier element, an air-sending amount, and a coefficient of performance (COP) of the Peltier element in a modified device of the present invention.

The cooling capacity of the Peltier element 12 can be controlled by the PWM method. However, the Peltier element 12 may be supplied with a control signal of a direct-current voltage, and the cooling capacity of the Peltier element 12 may be controlled by the voltage. In this case, when the applied voltage becomes slightly larger than zero, as shown in FIG. 6, the COP of the Peltier element 12 is rapidly increased to a maximum value $\alpha_p$.

The Peltier element 12 is located such that the first heat exchanger 12a cools air, in this embodiment. However, a polar character of a voltage applied to the Peltier element 12 may be changeable. The device may include a switch to switch the operation of the first heat exchanger 12a between cooling operation for cooling air and heating operation for heating air. In this case, the device can cool or heat air using the Peltier element 12 by changing the switch. In a case where the first heat exchanger 12a of the Peltier element 12 is switched to perform the heating operation for heating air, when a target heating value is smaller than a first value, the operation of the Peltier element 12 is stopped. In contrast, when the target heating value is equal to or larger than the first value, the operation of the Peltier element 12 is started to heat air passing therethrough, similarly to the cooling operation.

When the target cooling value or target heating value is equal to or larger than the first value R, the air-sending amount of the fan 11 is kept to be the maximum amount. However, when the maximum amount is defined as 100% and the minimum amount is defined as 0%, the air-sending amount of the fan 11 may be controlled in a range between 60% and 100%.

Air is used as a thermal medium in this embodiment. Alternatively, water may be used as the thermal medium. In this case, a water pump replaces the fan 11.

The Peltier element 12 is used as the thermoelectric conversion unit in this embodiment. However, the thermoelectric conversion unit is not limited to the Peltier element 12.

The air-conditioning device is used for the seat in the vehicle. Alternatively, the air-conditioning device may be used inside of a house or a building. For example, the air-conditioning device may be used in a bathroom.

The fan 11 and the Peltier element 12 are controlled based on the target cooling value or the target heating value input into the operation panel 20. However, the device may include a sensor for detecting an environmental condition, e.g., outside air temperature, compartment temperature (inside air temperature), seat surface temperature or solar radiation amount. A target temperature as the target cooling value and the target heating value may be calculated based on an instruction input into the operation panel 20 and the environmental condition. Then, the fan 11 and the Peltier element 12 may be controlled based on the calculated target temperature.

For example, a target cooling value TCV may be calculated by using Formula 1, in which I represents an instructed cooling value input into the operation panel 20, T1 represents the seat surface temperature, T2 represents the outside air temperature, and S represents the solar radiation amount entering into the compartment. In addition, $\alpha$, $\beta$, $\gamma$, $\delta$, $\epsilon$ represent constants.

$$TCV = \alpha \times I - \beta \times T1 - \gamma \times T2 - \delta \times S + \epsilon \quad \text{(Formula 1)}$$

In Formula 1, the seat surface temperature T2 may be replaced by the compartment temperature (inside air temperature).

Such changes and modifications are to be understood as being within the scope of the present invention as defined by the appended claims.

What is claimed is:

1. An air-conditioning device for cooling comprising:
a pump sending a thermal medium;
a thermoelectric conversion unit absorbing heat from the thermal medium so as to cool the thermal medium;
a target setting unit manually setting a target cooling value for cooling the thermal medium; and
a controlling unit controlling a flow amount of the thermal medium from the pump based on the target cooling value and controlling a heat-absorbing amount of the thermoelectric conversion unit based on the target cooling value, wherein
the controlling unit increases the flow amount of the thermal medium from the pump gradually from a first flow amount to a second flow amount in accordance with the target cooling value and stops the thermoelectric conversion unit from absorbing heat, when the target cooling value is smaller than a predetermined value;
the controlling unit increases the heat-absorbing amount of the thermoelectric conversion unit in accordance with the target cooling value and keeps the flow amount of the thermal medium from the pump at the second flow amount, when the target cooling value is equal to or larger than the predetermined value; and
the second amount of the thermal medium from the pump is in a range between 60% and 100%, when a maximum amount of the thermal medium from the pump is defined as 100% and when a minimum amount of the thermal medium from the pump is defined as 0%.

2. The air-conditioning device according to claim 1, wherein
the thermal medium is one of air and water.

3. The air-conditioning device according to claim 1, wherein the thermal medium is air, the device further comprising:
a seat, on which a human is seated, the seat having a seat surface with a plurality of pores therein; and
a duct, through which air is sent into the seat, wherein
the pump is a fan for sending air, and
the thermoelectric conversion unit absorbs heat from air sent by the fan, and the heat-absorbed air is blown toward the human through the duct and the pores of the seat.

4. The air-conditioning device according to claim 1, wherein
the controlling unit controls the heat-absorbing amount of the thermoelectric conversion unit by a duty ratio of a control signal having a constant height.

5. The air-conditioning device according to claim 1, wherein
the controlling unit controls the heat-absorbing amount of the thermoelectric conversion unit by controlling a direct-current voltage applied to the thermoelectric conversion unit.

6. The air-conditioning device according to claim 1, wherein the controlling unit automatically controls the flow amount of the thermal medium from the pump and automatically controls the heat-absorbing amount of the thermoelectric conversion unit.

7. The air-conditioning device according to claim 1, wherein the thermoelectric conversion unit is always not powered when the target cooling value is smaller than the predetermined value.

8. The air-conditioning device according to claim 1, wherein the controlling unit increases the heat-absorbing amount of the thermoelectric conversion unit only when the target cooling value is equal to or larger than the predetermined value.

9. The air-conditioning device according to claim 1, wherein the control unit gradually increases the heat-absorbing amount from a first heat-absorbing amount to a second heat-absorbing amount in accordance with the target cooling value when the target cooling value is equal to or greater than the predetermined value.

10. An air-conditioning device for heating comprising:
a pump sending a thermal medium;
a thermoelectric conversion unit radiating heat from the thermal medium so as to heat the thermal medium;
a target setting unit setting a target heating value for heating the thermal medium; and
a controlling unit controlling a flow amount of the thermal medium from the pump and a heat-radiating amount of the thermoelectric conversion unit based on the target heating value, wherein
the controlling unit increases the flow amount of the thermal medium from the pump gradually from a first flow amount to a second flow amount in accordance with the target cooling value and stops the thermoelectric conversion unit from radiating heat, when the target heating value is smaller than a predetermined value;
the controlling unit increases the heat-radiating amount of the thermoelectric conversion unit in accordance with the target heating value and keeps the flow amount of the thermal medium from the pump at the second flow amount, when the target heating value is equal to or larger than the predetermined value; and
the second amount of the thermal medium from the pump is in a range between 60% and 100%, when a maximum amount of the thermal medium from the pump is defined as 100% and when a minimum amount of the thermal medium from the pump is defined as 0%.

11. The air-conditioning device according to claim 10, wherein the controlling unit automatically controls the flow amount of the thermal medium from the pump and automatically controls the heat-radiating amount of the thermoelectric conversion unit.

12. The air-conditioning device according to claim 10, wherein the thermoelectric conversion unit is always not powered when the target heating value is smaller than the predetermined value.

13. The air-conditioning device according to claim 10, wherein the controlling unit increases the heat-radiating amount of the thermoelectric conversion unit only when the target heating value is equal to or larger than the predetermined value.

14. The air-conditioning device according to claim 10, wherein the control unit gradually increases the heat-absorbing amount from a first heat-absorbing amount to a second heat-absorbing amount in accordance with the target cooling value when the target cooling value is equal to or greater than the predetermined value.

* * * * *